Oct. 4, 1966
G. N. HOUCK ETAL
3,277,233
CONDUIT WITH PARTIALLY EXPOSED GROUND
WIRE EXTENDING FROM END TO END
Filed Jan. 2, 1964
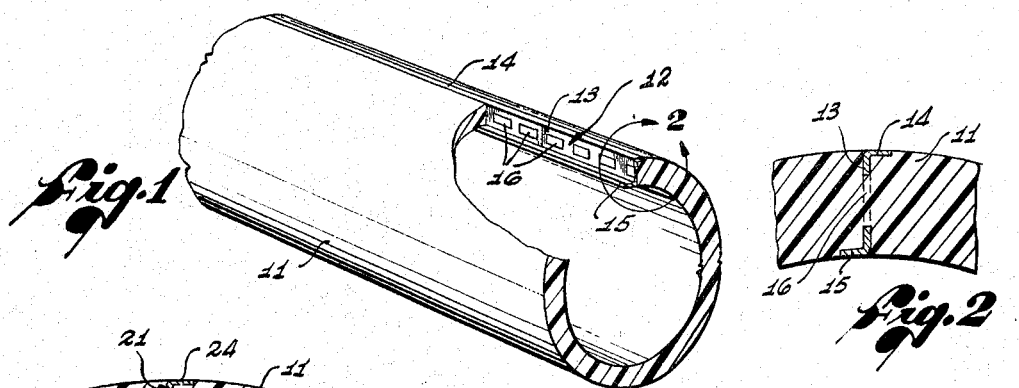
Fig.1
Fig.2
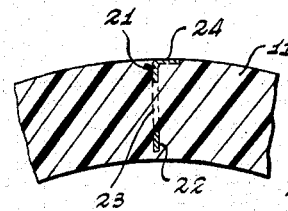
Fig.4
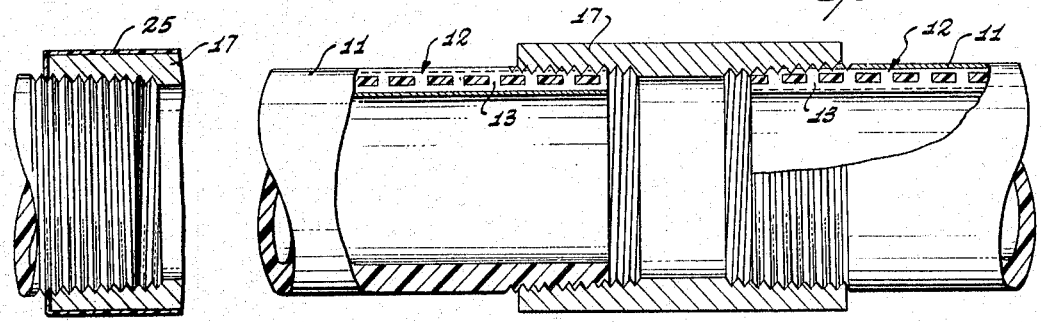
Fig.3
Fig.5
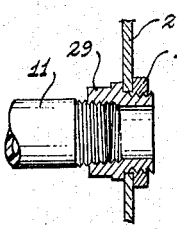
Fig.7
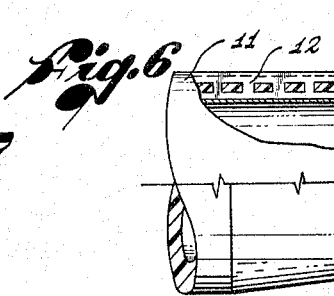
Fig.6
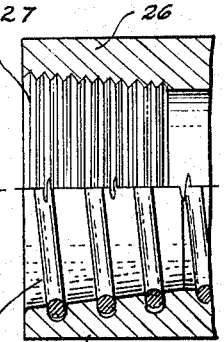
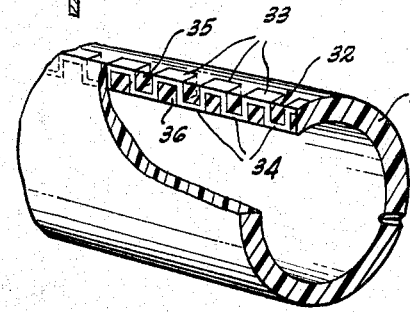
Fig.8
INVENTORS
GILLETTE N. HOUCK
RICHARD J. ROSS
BY
James E. Cooney
ATTORNEY United States Patent Office 3,277,233
Patented Oct. 4, 1966

3,277,233
CONDUIT WITH PARTIALLY EXPOSED GROUND WIRE EXTENDING FROM END TO END
Gillette N. Houck, Lafayette, and Richard J. Ross, Walnut Creek, Calif., assignors to Kaiser Aluminum & Chemical Corporation, Oakland, Calif., a corporation of Delaware
Filed Jan. 2, 1964, Ser. No. 335,234
7 Claims. (Cl. 174—78)

The present invention relates to conduit for enclosing electric wires, and more particularly to such wiring conduit formed of plastic insulating material.

Rigid conduit of plastic material used for electrical raceways has certain advantages, such as resistance to corrosion, light weight, low cost and immunity to electrolytic action. However, since it is a non-conductor of electricity, fault currents will not be carried to ground through plastic conduits as they are in the case of metallic conduits. One method of providing a ground path is to pull in a separate grounding conductor with the insulated circuit conductors in the plastic conduit. This solution has the disadvantages of requiring additional material, reducing the capacity of the conduit, and, in particular, adding to the labor costs of installing the conduit and the electrical conductors therein.

According to the present invention, a continuous grounding circuit is provided for plastic conduit by integrally embedding electrically conducting, metallic ground conductors in the walls of the plastic conduit sections. The ground conductors may be exposed at either or both the inside and outside surfaces of the plastic conduit and continuity of the grounding circuit throughout the conduit length is secured by conducting couplings between conductor strips, which couplings may be embodied in the regular junction fittings for the sections of the plastic conduit.

The grounding conductor is preferably embodied in a metallic strip embedded in the conduit wall and provided with slots or other formations permitting the plastic material to extend through the metallic strip to preserve the circumferential continuity of the plastic conduit.

Other features and objectives of the present invention will be readily apparent to those skilled in the art from the following specification and the appended drawing, in which:

FIG. 1 is a broken away, perspective view of a grounding plastic conduit according to the present invention;

FIG. 2 is an enlarged detailed sectional view within the circle 2 of FIG. 1;

FIG. 3 is a view, partly in section, partly in elevation, and partly broken away, of one form of joint between conduit sections;

FIG. 4 is a view similar to FIG. 2 but showing a different grounding conductor;

FIG. 5 is a partial longitudinal sectional view of a modified form of coupling;

FIG. 6 illustrates another form of conduit joint using self-threading couplings;

FIG. 7 is a detailed sectional view showing one manner of connecting the conduit to a connection box; and FIG. 8 is a view similar to FIG. 1 but showing a differently shaped grounding conductor.

The plastic conduit electrical raceway according to the present invention may be formed of any desired plastic insulating material, thermoplastic or thermosetting, but preferably of a thremoplastic material such as polyvinyl chloride. Such conduit, in the form of a continuous tube of standard length, is shown at 11 in the drawing. In the conduit wall is an embedded metallic strip 12, preferably of a good electrical conducting material such as aluminum.

This metallic strip, as shown more particularly in FIGS. 1 and 2, is of a modified S shape in cross section having a central web 13 which extends longitudinally and radially of the tubing and a pair of end flanges 14 and 15 which extend longitudinally and circumferentially of the tubing. The outer surface of the flange 14 forms substantially a continuation of the cylindrical outer surface of the tube 11 and is accessible thereat, and the outer surface of the flange 15 forms substantially a continuation of the inner cylindrical surface of the tube 11.

The web 13 is provided with a plurality of spaced slots 16 along its length and the plastic material of the tube 11 extends through the slots 16 to preserve the circumferential continuity of the plastic material of the conduit.

One manner of forming the conduit of FIGS. 1 and 2 is to feed a metallic strip 12 into a prepared mandrel in a plastic pipe extrusion die and embed the strip in the conduit wall during the process of forming the conduit. The plastic material of the conduit flows through the slots 16 so that the strip 12 is firmly embedded within the conduit wall to form a unitary structure of plastic insulating conduit and embedded continuous metallic grounding conductor.

FIG. 3 illustrates a joint between conduit sections which preserves the electrical continuity of the grounding circuit throughout the conduit length. A metallic, electrically conducting, tubular pipe coupling 17 is interiorly threaded at its opposite ends to thread on the adjacent ends of the separate conduit sections 11 to join them mechanically to continue the electrical raceway and also serving to join the separate grounding conductors 12 for electrical continuity. As shown in FIG. 3, the webs 13 are cut by the circumferential threads in the outer walls of the conduit sections, and the coupling 17 threads on the section ends to make electrical connection between the separate webs at their respective threaded portions. The coupling members 17 may be standard pre-threaded items and the conduit section either pre-threaded or threaded in the field, the latter practice being of course necessary where the conduit section is cut to length.

In the modification of FIG. 4, the conduit 11 employs as its embedded grounding conductor a continuous metallic strip 21 having a radially extending portion 22 corresponding to the web 13 and openings 23 therethrough corresponding to the slots 16. The strip 21 has an outer flange 24 corresponding to the flange 14 and likewise exposed and accessible to the outer surface of the conduit. The radial portion 22 terminates short of the interior surface of the conduit 11 so that the grounding strip 21 is not exposed nor accessible at the interior of the conduit.

FIG. 5 shows a conduit section joint similar to that of FIG. 3 but in which the conducting coupling 17, which mechanically and electrically interconnects the conduit sections, is provided with an insulating coating 25.

FIG. 6 indicates other types of connection between conduit sections which again serve both to join the sections of conduit 11 mechanically and also to interconnect the grounding strips 12. In the one instance, as indicated in the top portion of FIG. 6, a coupling member 26 of electrically conducting, metallic material is provided with self-cutting threads 27 which cut their own complementary threads in the end of the conduit 11 and the grounding strip 12 as the coupling is rotated thereon.

Thus, it is unnecessary in this case to pre-form threads on the ends of the conduit 11 or to cut threads thereon in the field since the coupling 26 can be rotatably threaded on the smooth ends of the conduit to cut its own threads therein to both mechanically interconnect adjacent ends of conduit sections and electrically connect their grounding strips into which the threads cut as well.

In another instance, as indicated in the bottom portion of this FIG. 6, coupling member 26 may have a helically disposed metal ring 42 mounted in a helical groove 40 therein which advantageously contacts the grounding strips 12 regardless of their position within the coupling member 26.

FIG. 7 shows the connection of a conduit and its grounding trip to a connection box having a metal wall 28. A fitting 29, also of metal, is threaded onto the end of the conduit 11 to make contact with its grounding strip 12 and extends through an opening in wall 28. The fitting 29 is provided with a shoulder engaging the outside surface of the wall 28 and a nut 31 threads on its inner end against the inner surface of the wall 28 to hold the fitting thereagainst in electrically conducting relation.

FIG. 8 shows a plastic conduit 11 with a different shaped grounding strip 32 embedded therein. The strip 32 may also be formed of a good electrically conducting material, such as aluminum, and has a rectangular wave or corrugated shape presenting exterior conducting surfaces 31, flush with and accessible at the outer surface of the conduit 11, and radially and longitudinally spaced inner conducting surfaces 34, flush with and accessible at the interior surface of the conduit 11. The outwardly opening spaces 35 between the outer surfaces 33 and the inwardly opening spaces 36 between the inner surfaces 34 provide passage of the plastic material of conduit 11 across the strip 32 to preserve the circumferential continuity of the plastic conduit. The grounding strip 32 functions substantially the same as the grounding strip 12, and the sections of the conduit of FIG. 8 may be joined in the same manner as previously described and shown in FIGS. 3, 5, 6 and 7.

While certain preferred embodiments of this invention have been specifically illustrated and described, it will be understood that the invention is not limited thereto as many variations will be apparent to those skilled in the art and the invention is to be given its broadest interpretation within the terms of the following claims.

What is claimed is:

1. An electrical raceway comprising: a plurality of sections of plastic conduit mounted in end-to-end relation to provide a continuous conduit to enclose a plurality of electrical wires passing therethrough; a partially exposed electrically conducting ground conductor integrally embedded in the wall of each of said conduit sections and extending continuously in a partially exposed condition between the ends thereof, the ground conductor being partially exposed and embedded in such a fashion in each section so as to facilitate electrical grounding thereof at any point along the section; and coupling means for mechanically interconnecting adjacent ends of said conduit sections to form a continuous conduit, said coupling means including electrically conducting means interconnecting the adjacent and partially exposed portions of the ends of said ground conductors so as to provide a continuous electrical ground conductor extending along the raceway.

2. The electrical raceway defined in claim 1 in which said coupling means comprises, a metallic, electrically conducting tubular member threaded on adjacent section ends and with its threads engaging complementary threads in the ground conductors in conducting relation therewith.

3. The electrical raceway defined in claim 1 in which said coupling means comprises a metallic electrically conducting tubular member provided with a metallic helical element anchored thereto, said helical element being adapted to engage said ground conductors in conducting relation therewith.

4. A plastic insulating conduit for enclosing a plurality of electrical wires; and a partially exposed electrically conducting ground conductor integrally embedded in the conduit wall and extending between the ends of the conduit, said conductor having openings therethrough for passage of the plastic material of the conduit so as to preserve thereat the circumferential continuity of the conduit wall.

5. The conduit defined in claim 4 in which said ground conductor is exposed and accessible at the exterior surface of the conduit.

6. The conduit defined in claim 4 in which said ground conductor is of modified S shape in cross section having a radially disposed central web embedded in the conduit wall and end flanges substantially flush with and exposed at the outer and inner surfaces of the conduit, said central web having the openings therethrough for passage of the plastic material of the conduit to maintain thereat the circumferential continuity of the conduit wall.

7. The conduit defined in claim 4 in which said ground conductor is of generally corrugated, metallic strip form with the adjacent waves reversely exposed at the outer and inner surfaces of the conduit and with the spaces therebetween providing the openings passing the plastic material of the conduit to preserve the circumferential continuity of the conduit wall thereat.

References Cited by the Examiner

UNITED STATES PATENTS

| 680,834 | 8/1901 | Bathurst | 174—51 |
| 749,633 | 1/1904 | Seeley | 174—47 |
| 2,451,868 | 10/1948 | Quackenbush et al. | 174—88 |

FOREIGN PATENTS

| 201,373 | 12/1958 | Austria. |
| 524,909 | 5/1956 | Canada. |
| 72,905 | 8/1951 | Denmark. |
| 240,721 | 10/1925 | Great Britain. |

LEWIS H. MYERS, *Primary Examiner.*

JOHN F. BURNS, ROBERT K. SCHAEFER,
*Examiners.*

W. B. FREDRICKS, J. F. RUGGIERO,
*Assistant Examiners.*